(12) United States Patent
Nakagawa

(10) Patent No.: US 7,397,733 B2
(45) Date of Patent: Jul. 8, 2008

(54) OPTICAL PICKUP

(75) Inventor: Ryotaro Nakagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 561 days.

(21) Appl. No.: 11/115,279

(22) Filed: Apr. 27, 2005

(65) Prior Publication Data

US 2005/0243662 A1   Nov. 3, 2005

(30) Foreign Application Priority Data

Apr. 28, 2004   (JP) ............... P2004-132703

(51) Int. Cl.
   *G11B 7/00*   (2006.01)
(52) U.S. Cl. ............... 369/44.16; 369/44.21
(58) Field of Classification Search ........... None
   See application file for complete search history.

(56) References Cited

U.S. PATENT DOCUMENTS 5,726,968 A * 3/1998 Blankers et al. ........... 720/688
7,196,978 B2 * 3/2007 Iida et al. ............... 369/44.15
2003/0202435 A1 * 10/2003 Nakagawa et al. ....... 369/44.21
2004/0190403 A1 * 9/2004 Nakamura et al. ....... 369/44.11

FOREIGN PATENT DOCUMENTS

| JP | 62-63824 U | 4/1987 |
| JP | 1-192024 | 8/1989 |
| JP | 10-334486 A | 12/1998 |
| JP | 2000-57600 A | 2/2000 |
| WO | WO03/067583 | * 8/2003 |

* cited by examiner

*Primary Examiner*—Wayne Young
*Assistant Examiner*—Lixi Chow
(74) *Attorney, Agent, or Firm*—Morgan, Lewis & Bockius LLP

(57) ABSTRACT

A lens holder is provided with a focusing coil for urging the lens holder in a focusing direction and tracking coils for urging the lens holder in a tracking direction in cooperation with magnets. A magnet is disposed in a space where the focusing coil and the tracking coil are opposed to each other in a through hole of the lens holder, such that a magnetized surface on one surface side of the magnet is opposed to the focusing coil and a magnetized surface on the other surface side thereof is opposed to the tracking coil.

1 Claim, 4 Drawing Sheets

OPTICAL PICKUP

BACKGROUND OF THE INVENTION

1. Field of the Invention

The present invention relates to an optical pickup, and more particularly to an optical pickup including an actuator in which a focusing coil and tracking coils are mounted in a lens holder having an objective lens, and which has magnets for forming magnetic circuits together with the focusing coil and the tracking coils.

2. Description of the Related Art

An optical pickup is used in an optical disk apparatus for effecting recording or reproduction with respect to an optical disk, and a lens holder equipped with an objective lens is mounted on a base member for which access control is provided in a direction along a radial direction of the optical disk. In addition, displacement control is provided for the lens holder in a focusing direction and a tracking direction with respect to the optical disk by the operation of an actuator so as to compensate for a change in the positional relationship between the optical disk and the objective lens in consequence of such as the warpage and eccentricity of the optical disk. A general actuator is constructed by a combination of a focusing coil, tracking coils, and magnets which are mounted on the lens holder supported on the base member displaceably in the aforementioned two directions.

Conventionally, various proposals have been made as to the construction of the actuator of an optical pickup of this type (e.g., refer to JP-A-2000-57600 and JP-A-10-334486). Next, referring to FIGS. 3 and 4, a description will be given of the construction of the actuators disclosed in JP-A-2000-57600 and JP-A-10-334486. It should be noted that in FIGS. 3 and 4 identical or corresponding portions will be denoted by the same reference numerals to facilitate understanding.

FIG. 3 shows the construction of the actuator described in JP-A-2000-57600. In this actuator, a lens holder 2 provided with an objective lens 1 displaceably in the focusing direction and the tracking direction is supported by a fixing member 5a on a base 5 side by means of a suspension 5b. One focus coil 3 and four tracking coils 4 are mounted on the lens holder 2, and plate piece-like permanent magnets 7 are respectively attached to two yokes 6 on the base 5. Further, only a magnetized surface on one surface side of each permanent magnet 7 is opposed to the tracking coils 4 and the focus coil 3 in the same direction, while a magnetized surface on the other surface side is joined to the yoke 6 in a superposed manner. In addition, the focus coil 3 is located on the opposite side to the permanent magnet 7 with the tracking coils 4 disposed therebetween.

FIG. 4 shows the construction of the actuator described in JP-A-10-334486. In this actuator, the focusing coil 3 and the tracking coils 4 are mounted on the lens holder 2 having the objective lens, and the plate piece-like magnet 7 is attached to the yoke 6. Further, only a magnetized surface on one surface side of each magnet 7 is opposed to the tracking coils 4 and the focusing coil 3 in the same direction, while a magnetized surface on the other surface side is joined to the yoke 6 in a super posed manner. In addition, the focusing coil 3 is located on the opposite side to the magnet 7 with the tracking coils 4 disposed therebetween.

In the conventional actuator shown in the above-described JP-A-2000-57600 or the JP-A-10-334486, in each case, only the magnetized surface on one surface side of the magnet (permanent magnet) 7 is opposed to the tracking coils 4 and the focus coil (focusing coil) 3 in the same direction, while the magnetized surface on the other surface side is only joined to the yoke 6 in a superposed manner. Additionally, the focus coil (focusing coil) 3 is located on the opposite side to the magnet (permanent magnet) 7 with the tracking coils 4 disposed therebetween. For this reason, only the magnetized surface on one surface side of the magnet (permanent magnet) 7 contributes to a magnetic circuit formed by the cooperation of the magnet (permanent magnet) 7 and the tracking coils 4, and the magnetized surface on the other surface side does not contribute to that magnetic circuit. Similarly, only the magnetized surface on one surface side of the magnet (permanent magnet) 7 contributes to a magnetic circuit formed by the magnet (permanent magnet) 7 and the focus coil (focusing coil) 3, and the magnetized surface on the other surface side does not contribute to that magnetic circuit.

In the conventional optical pickups described above, the focus coil (focusing coil) 3 is located on the opposite side to the magnet (permanent magnet) 7 with the tracking coils 4 disposed therebetween, only the magnetized surface on one surface side of the magnet (permanent magnet) 7 is used to form the magnetic circuit, and the magnetized surface on the other surface side is not used to form the magnetic circuit. In this situation, however, it has been difficult to efficiently improve both the sensitivity during the operation in the tracking direction and the sensitivity during the operation in the focusing direction by disposing the magnetized surface of the magnet in close proximity to both the tracking coils and the focusing coil.

Namely, even if the sensitivity during the operation in the tracking direction could be improved by disposing the magnetized surface on one surface side of the magnet close to the tracking coils, since the focusing coil is located on the opposite side to the magnet with the tracking coils disposed therebetween, the tracking coils constitute obstructions, and therefore a limitation occurs to disposing the magnetized surface on one surface side of the magnet close to the focusing coil. Hence, it has been difficult to efficiently improve both the sensitivity during the operation in the tracking direction and the sensitivity during the operation in the focusing direction.

SUMMARY OF THE INVENTION

The invention has been devised in view of the above-described situation, and its object is to provide an optical pickup which is capable of efficiently improving both the sensitivity during the operation in the tracking direction and the sensitivity during the operation in the focusing direction without increasing the number of magnets used.

Another object of the invention is to provide an optical pickup which is capable of efficiently improving both the sensitivity during the operation in the tracking direction and the sensitivity during the operation in the focusing direction by allowing not only the magnetized surface on one surface side of the magnet but also the magnetized surface on the other surface side to contribute to the formation of magnetic circuits.

The optical pickup in accordance with the invention is an optical pickup having an actuator in which a lens holder having an objective lens is provided with a focusing coil for urging the lens holder in a focusing direction and tracking coils for urging the lens holder in a tracking direction in cooperation with magnets, characterized in that each of the magnets is disposed in a space where the focusing coil and the tracking coil are opposed to each other, such that a magnetized surface on one surface side of the magnet is opposed to the focusing coil, and a magnetized surface on the other surface side of the magnet is opposed to the tracking coil.

If the above-described construction is provided, a magnetic circuit formed by the focusing coil and the magnetized surface on one surface side of the magnet serves to control the displacement of the lens holder in the focusing direction, while a magnetic circuit formed by the tracking coil and the magnetized surface on the other surface side of the magnet serves to control the displacement of the lens holder in the tracking direction. In addition, the construction adopted is such that each of the magnets is disposed in a space where the focusing coil and the tracking coil are opposed to each other, such that a magnetized surface on one surface side of the magnet is opposed to the focusing coil, and a magnetized surface on the other surface side of the magnet is opposed to the tracking coil. Therefore, since each magnet can be disposed close to both the focusing coil and the tracking coil, it becomes possible to efficiently improve both the sensitivity during the operation in the tracking direction and the sensitivity during the operation in the focusing direction.

In the invention, it is possible to adopt a construction in which the tracking coils are disposed on both sides between which the focusing coil is disposed, and the magnets are disposed separately in the respective opposition spaces on both sides of the focusing coil. According to this construction, the lens holder can easily be subjected to displacement control in the focusing direction and the tracking direction with a good balance.

Furthermore, the invention can be further implemented by adopting a construction of an optical pickup having an actuator in which a lens holder having an objective lens is provided with a focusing coil for urging the lens holder in a focusing direction and tracking coils for urging the lens holder in a tracking direction in cooperation with magnets, characterized in that the tracking coils are respectively disposed on both sides between which the focusing coil is disposed, that a pair of through holes are respectively provided in the lens holder between a portion where the focusing coil is disposed and a portion where the tracking coil on one side is disposed and between the portion where the focusing coil is disposed and a portion where the tracking coil on the other side is disposed, that each of a pair of plate piece-like magnets is disposed in a space where the focusing coil and the tracking coil are opposed to each other in each of the through holes, such that a magnetized surface on one surface side of each of the pair of plate piece-like magnets is opposed to the focusing coil and a magnetized surface on the other surface side thereof is opposed to the tracking coil, and that the lens holder is positioned so as to be displaceable in the focusing direction and the tracking direction by a supporting shaft disposed in a central portion of the portion where the focusing coil is disposed. The operation of this invention will be described in detail by referring to an embodiment which will be described later.

As described above, according to the invention, despite the fact that the arrangement of the magnets, the focusing coil, and the tracking coils is only devised, both magnetized surfaces on one surface side and the other surface side of the magnet contributes to the formation of magnetic circuits for providing displacement control in the focusing direction or the tracking direction. Therefore, it becomes easily possible to reduce the interval of opposition between the magnet and the focusing coil and the interval of opposition between the magnet and the tracking coil more than in a conventional case. For this reason, it becomes possible to provide an optical pickup having an actuator which improves both the sensitivity during the operation in the tracking direction and the sensitivity during the operation in the focusing direction without increasing the number of magnets used. Accordingly, the performance stability of an optical disk apparatus adopting the optical pickup also improves.

Further, according to the invention, since a magnetic circuit is effectively constituted, an operating current of the focusing coil and that of the tracking coils can be reduced, with the result that a heat release value of the actuator can be reduced.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
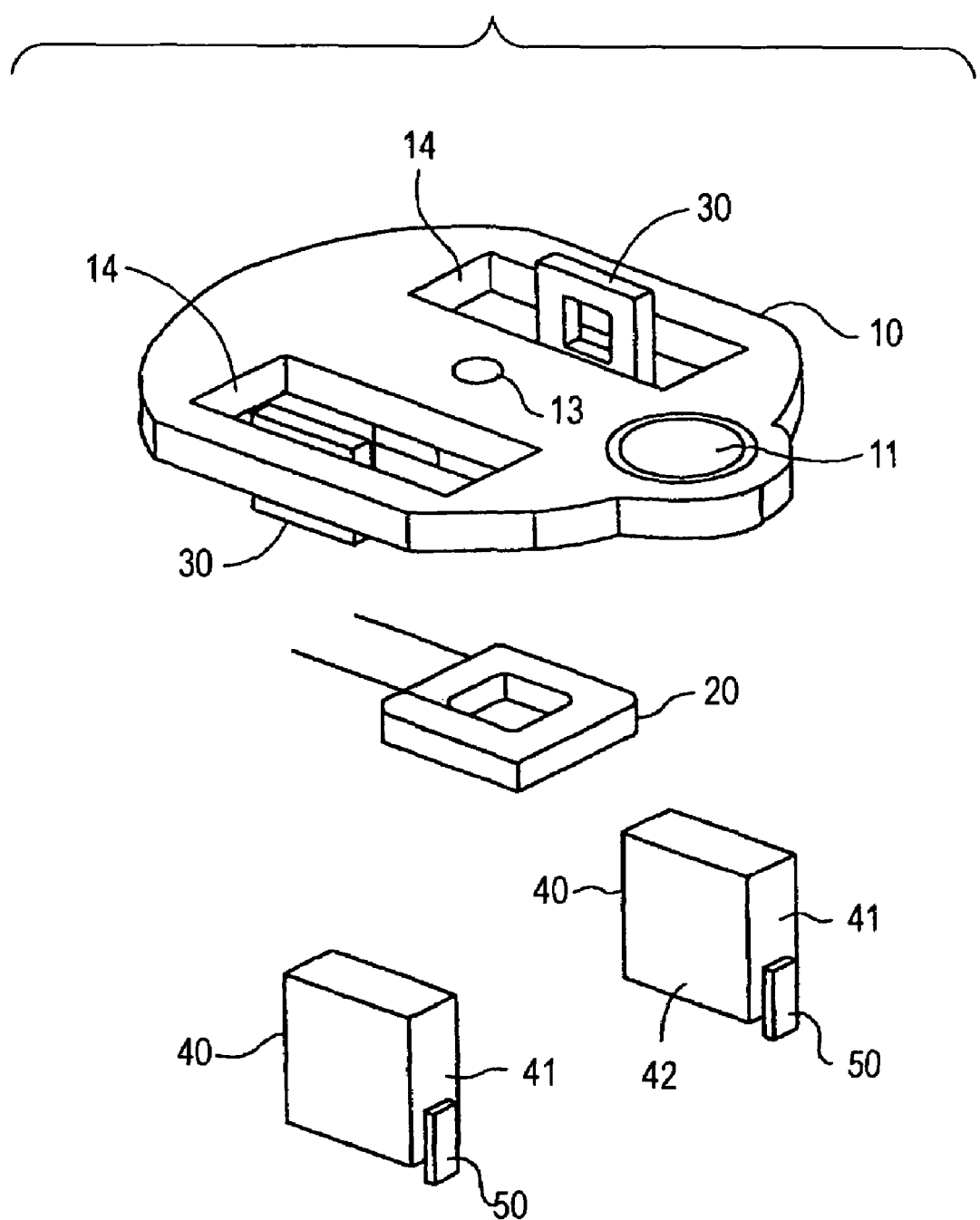
FIG. 1 is a schematic exploded perspective view of an actuator adopted in the optical pickup in accordance with the invention.
Figure 2:
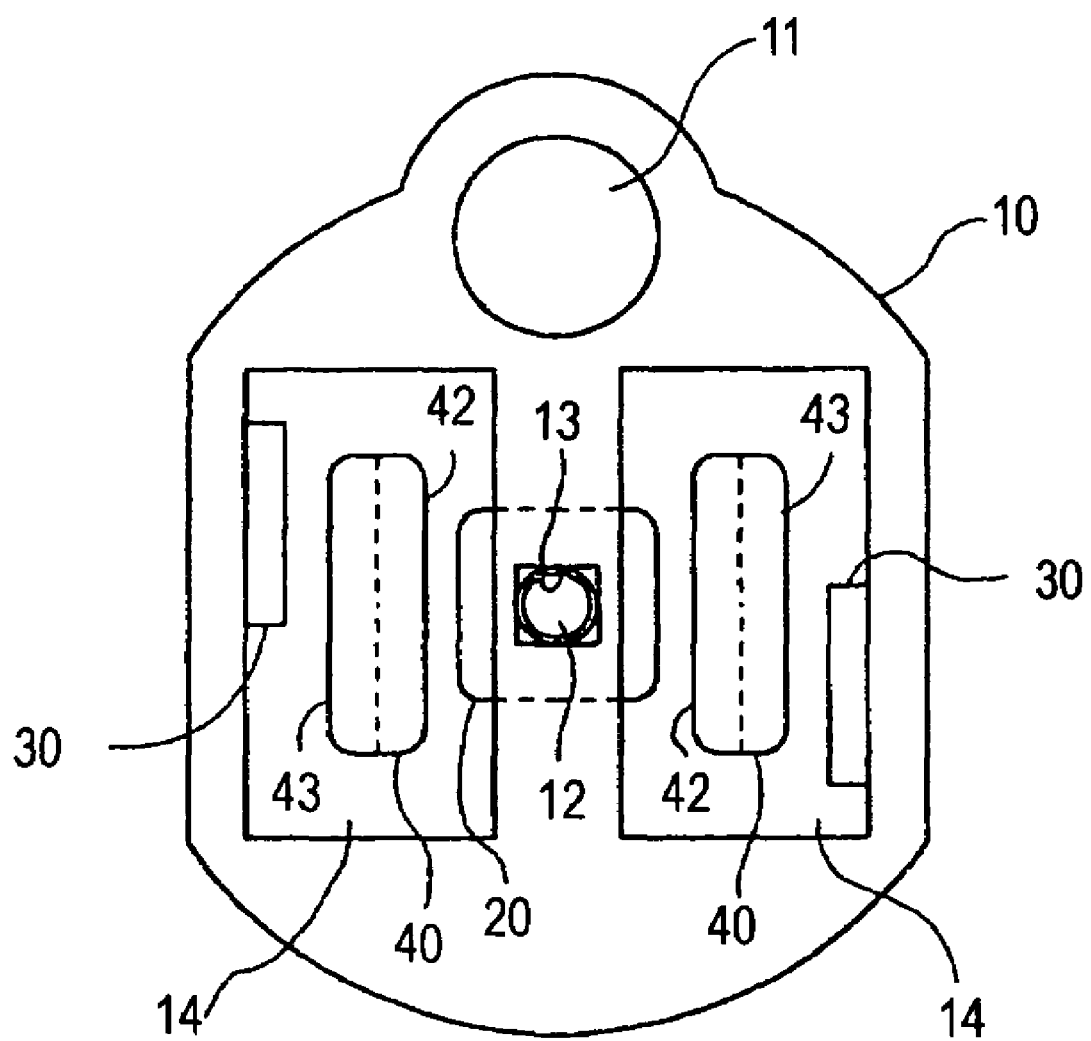
FIG. 2 is a schematic plan view of the actuator.

FIG. 1 is a schematic exploded perspective view of an actuator adopted in the optical pickup in accordance with the invention. FIG. 2 is a schematic plan view of the actuator.

In FIGS. 1 and 2, reference numeral 10 denotes a lens holder, and an objective lens 11 is provided at is front end portion, while a hole portion 13, into which a supporting shaft 12 secured perpendicularly on a base member (not shown) is fitted, is provided in its central portion. As the supporting shaft 12 is fitted in the hole portion 13, the lens holder 10 is positioned displaceably in a focusing direction and a tracking direction. In addition, a focusing coil 20 is joined to a lower surface of the lens holder 10 in a superposed manner in such a form as to surround the hole portion 13, while a pair of tracking coils 30 are respectively disposed on both left- and right-hand sides between which the focusing coil 20 is disposed. Further, a pair of rectangular through holes 14 are respectively provided between the portion where the focusing coil 20 is disposed and the portion where the tracking coil 30 on one side is disposed and between the portion where the focusing coil 20 is disposed and the portion where the tracking coil 30 on the other side is disposed. In contrast, a plate piece-like magnet is used as a magnet 40. Further, respective end faces 41 of the two magnets 40 having such a shape are respectively joined to two separate mounting pieces 50 provided uprightly on the unillustrated base member.

In addition, as shown in FIG. 2, as the supporting shaft 12 is fitted in the hole portion 13 of the lens holder 10, the supporting shaft 12 is disposed in a central portion of the portion where the focusing coil 20 is disposed. At the same time, each of the two separate magnets 40 is disposed in the space where the focusing coil 20 and the tracking coil 30 are opposed to each other in each of the left- and right-hand side through holes 14. As a result, a magnetized surface 42 on one surface side of the magnet 40 is opposed to the focusing coil 20, while a magnetized surface 43 on the other surface side thereof is opposed to the tracking coil 30.

If the actuator has the above-described construction, a magnetic circuit formed by the focusing coil 20 and the magnetized surface 42 on one surface side of the magnet 40 serves to control the displacement of the lens holder 10 in the focusing direction. In addition, a magnetic circuit formed by the-tracking coil 30 and the magnetized surface 43 on the other surface side of the magnet 40 serves to control the displacement of the lens holder 10 in the tracking direction. Moreover, since each magnet 40 is disposed in the space where the focusing coil 20 and the tracking coil 30 are opposed to each other, not only is the magnetized surface 42 on one surface side of the magnet 40 located in close proximity to the focusing coil 20, but also the magnetized surface 43 on the other surface side of the magnet 40 is located in close proximity to the tracking coil 30. Therefore, both the sensitivity during the operation in the tracking direction and the sensitivity during the operation in the focusing direction improve with a good balance. Moreover, since the tracking coils 30 are disposed on both sides between which the focusing coil 20 is disposed, and the magnets 40 are disposed separately in the respective opposition spaces on both sides of the focusing coil 20, the displacement of the lens holder 10 is controlled with a good balance in the focusing direction and the tracking direction.

Figure 3:
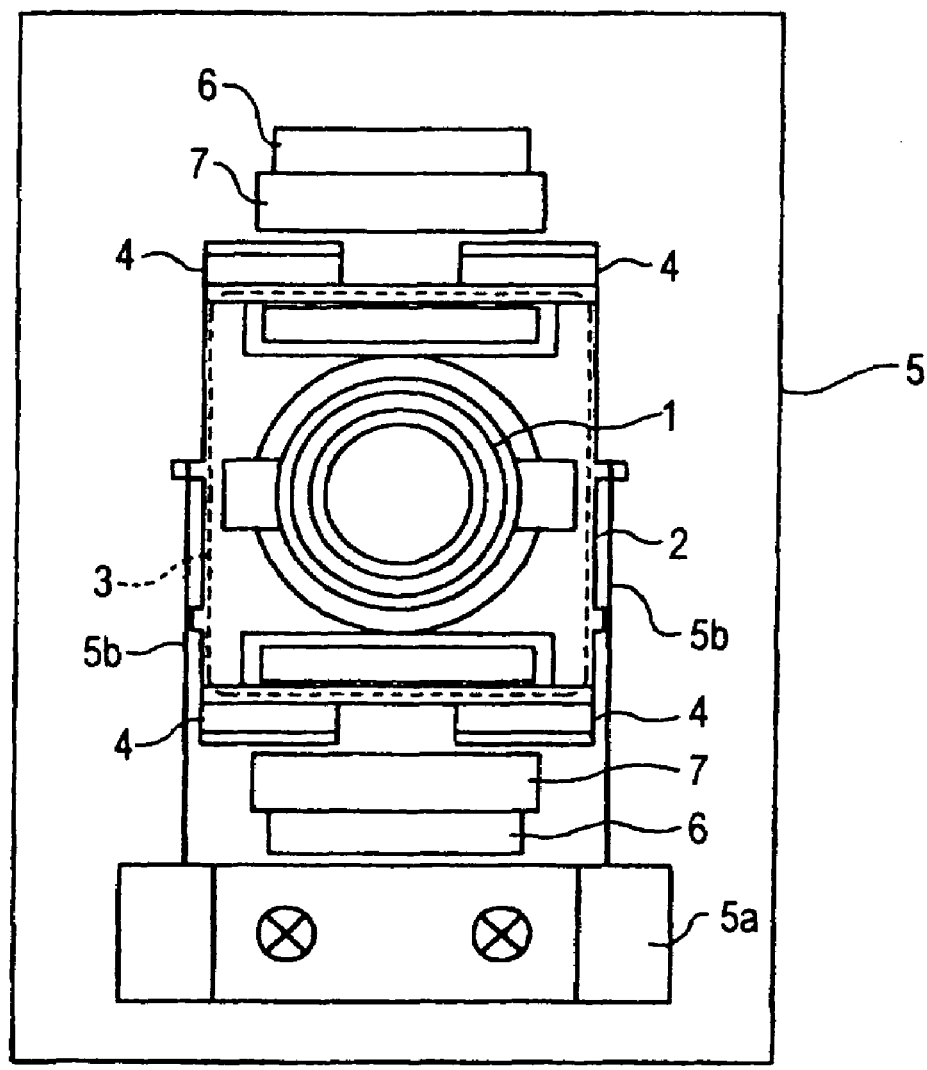
FIG. 3 is a plan view of the actuator as a conventional example.
Figure 4:
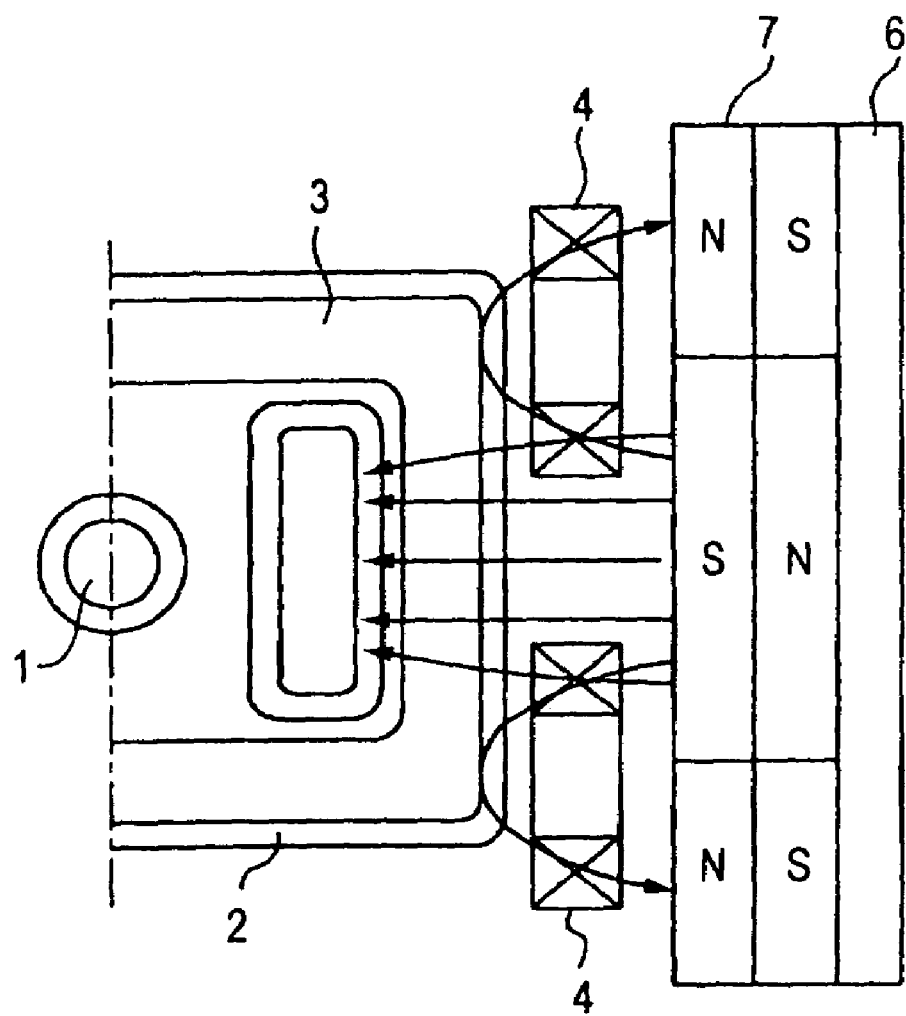
FIG. 4 is a plan view of the actuator as another conventional example.

Although in the actuator used in the optical pickup of this embodiment the lens holder 10 is positioned displaceably in the focusing direction and the tracking direction by the supporting shaft 12, instead of positioning the lens holder 10 by the supporting shaft 12, the actuator may be such that the lens holder 2 is positioned displaceably in the focusing direction and the tracking direction by means of the suspension, as shown in FIG. 3.

What is claimed is:

1. An optical pickup comprising:
 a lens holder for holding an objective lens; and
 an actuator having:
  a focusing coil for urging the lens holder in a focusing direction in cooperation with magnets; and
  tracking coils for urging the lens holder in a tracking direction in cooperation with the magnets, wherein:
 the tracking coils are respectively disposed on both sides between which the focusing coil is disposed;
 a pair of through holes are respectively provided in the lens holder between a portion where the focusing coil is disposed and a portion where the tracking coil on one side is disposed and between the portion where the focusing coil is disposed and a portion where the tracking coil on the other side is disposed;
 each of a pair of plate piece-like magnets is disposed in a space where the focusing coil and the tracking coil are opposed to each other in each of the through holes, such that a magnetized surface on one surface side of each of the pair of plate piece-like magnets is opposed to the focusing coil and a magnetized surface on the other surface side thereof is opposed to the tracking coil; and
 the lens holder is positioned so as to be displaceable in the focusing direction and the tracking direction by a supporting shaft disposed in a central portion of the portion where the focusing coil is disposed.

* * * * *